Aug. 22, 1967  M. J. PREBILIC, JR  3,337,701
RETARD SENSOR FOR RETARDED BOMBS
Filed June 29, 1965
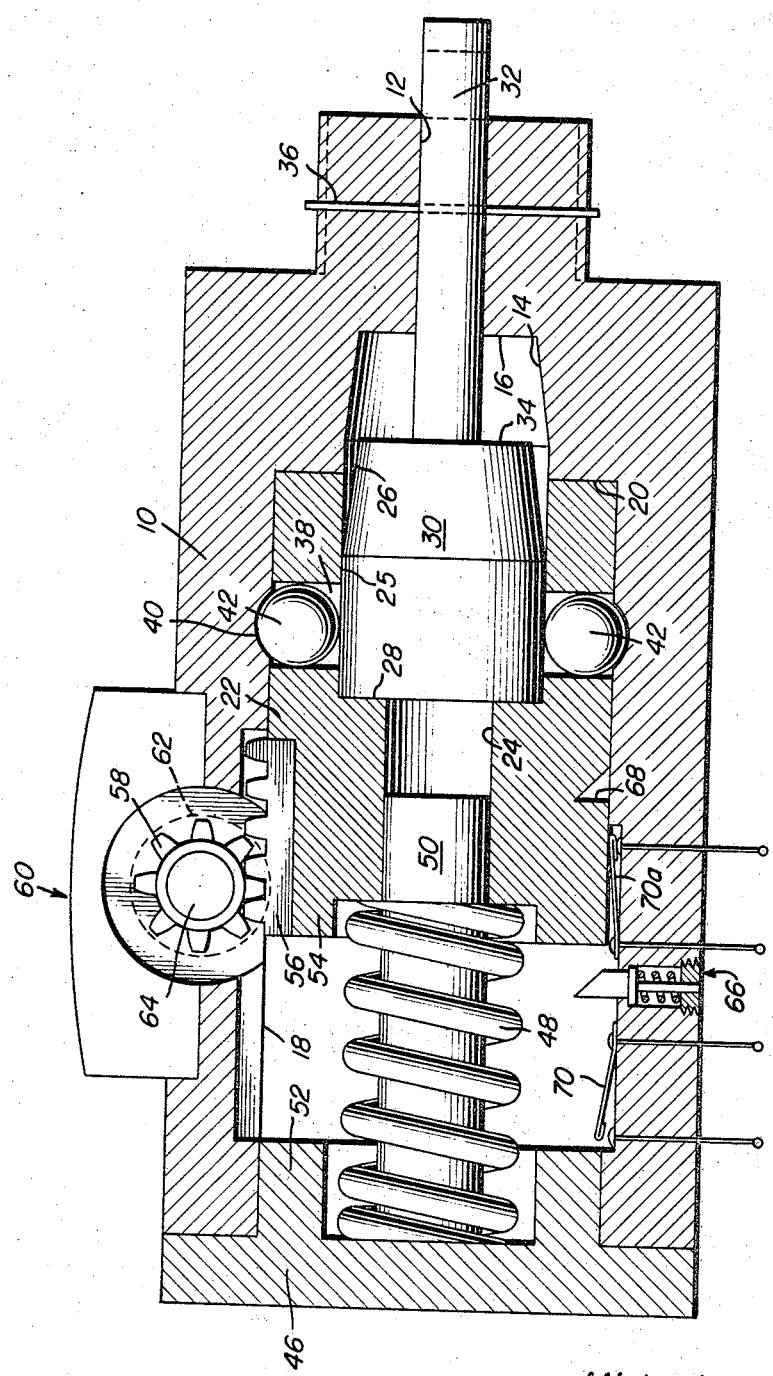
INVENTOR
Michael J. Prebilic, Jr.
BY
ATTORNEY
AGENT

3,337,701
RETARD SENSOR FOR RETARDED BOMBS
Michael J. Prebilic, Jr., Washington, D.C., assignor to the United States of America as represented by the Secretary of the Navy
Filed June 29, 1965, Ser. No. 468,175
6 Claims. (Cl. 200—61.45)

ABSTRACT OF THE DISCLOSURE

A retard sensor and switching device for a bomb fuze for sensing parachute retardation. Upon application of a predetermined force, such as a parachute snatch force, a plunger is pulled forward shearing a shear pin and freeing an inertial weight from a locked position. The weight, which comprises a movable contact in a switching readout arrangement, cooperates with an escapement mechanism and a gear rack to prevent movement to the actuating or switch-closing position until a given acceleration has been experienced for a given period of time. Removal of the acceleration prior to this time will permit a helical compression spring engaging the inertial weight to return it to its original position.

---

The invention described herein may be manufactured and used by or for the Government of the United States of America for governmental purposes without the payment of any royalties thereon or therefor.

This invention relates to a safety and arming mechanism for a parachute-retarded drop bomb and more specifically to an inertia operated switching device electrically connected to the fuze-arming timing mechanism for sensing the retarding force of the drop bomb to determine therefrom whether or not the parachute has fully deployed and which is designed to change the fuze arming time from a long interval to a short interval only if the parachute has fully deployed.

During certain low level bombing operations, a released free-falling drop bomb will assume an initial trajectory path very close to the path of travel of the airplane and can therefore explode substantially directly below the aircraft. Under such conditions, it is necessary to provide the drop bomb with a motion retarding means such as a parachute, for the purpose of decelerating the bomb to permit the aircraft to escape to a safe distance from the target before the bomb is detonated. It is desirable, of course, to have the fuze-arming timing interval as short as possible and yet permit the aircraft to advance to a safe distance from the target before the bomb is detonated, so that the bomb may be set to explode either above the ground or upon ground impact, as desired. If the bomb-retarding parachute fully deploys and sufficiently decelerates the free-falling bomb the aircraft will have sufficient time to escape the target area; but if the parachute does not fully deploy and does not sufficiently decelerate the bomb, the aircraft is most likely to be damaged by the explosion. It is therefore necessary to provide a device which is capable of determining whether or not the parachute has fully deployed and which then may be used to control the duration of the fuze-arming timing interval.

It is therefore an object of the present invention to provide a simple, rugged, and reliable device for sensing the deceleration forces on a parachute retarded drop bomb and for controlling the duration of the fuze-arming timing cycle accordingly.

Another object of the invention is to provide an inertia operated switching device for shortening the fuze arming time of a free-falling drop bomb only if a retarding force has been exerted upon said bomb for a predetermined interval of time and the magnitude of said force exceeds a predetermined minimum at the conclusion of the predetermined period of time.

Still another object of the invention is to provide an inertia operated switching device which is not responsive to a sudden initial force, such as a parachute snatch force, and yet may be actuated by constant forces of longer duration such that it will sense parachute retardation.

Various other objects and advantages will appear from the following description of one embodiment of the invention and the novel features will be particularly pointed out hereinafter in connection with the appended claims.

The novel features characteristic of the present invention, as well as additional objects and advantages thereof, will be better understood from the following detailed description when read in conjunction with the accompanying drawing in which:

The single figure is a central longitudinal section of a preferred embodiment of the present invention.

Referring now to the drawing, it may be seen that the retardation-sensing switching device of the present invention comprises a housing 10 having an axial bore 12 formed therethrough, a counterbore 14 formed therein to provide an annular shoulder 16, and a second counterbore 18 which provides an annular shoulder 20. An inertia weight member 22 is slideably received within counterbore 18 and is provided with an axial bore 24 therethrough and a counterbore 25 open to one end thereof and defining an annular shoulder portion 28 therebetween. A plunger 30 is slideably received within counterbore 25 of the inertia weight member 22 and normally abuts at one end thereof with the shoulder 28 formed therein. The plunger 30 has a conical shape 26 at its other end which faces counterbore 14 formed within housing member 10, and the counterbore 14 is similarly inclined between the shoulders 16 and 20 for receiving therein the conical end 26 of plunger 30 in close fitting relationship when the plunger is moved in that direction, such that the plunger is secured therein and prevented from subsequent movement to its original position. A rod member 32 is integrally connected to the conical end 26 of plunger 30, defining a shoulder portion 34 at the juncture with that end, and the rod 32 extends through bore 12 to the exterior of housing 10, where it is adapted to be connected to the shroud lines of a parachute. Housing 10 has a pair of opposed apertures communicating with the bore 12 therein and the rod member 32 is provided with a transverse aperture for alignment therewith to receive a shear pin 36, thereby securing plunger 30 in its normal position shown in the drawing.

The inertia weight member 22 is releasably secured to housing 10 by means of a ball-lock mechanism comprising a set of radial apertures 38 formed within and circumferentially spaced about the cylindrical wall of the inertia weight member and aligned with corresponding detents 40 formed in the inner peripheral surface of the counterbore 18, and a plurality of spherical balls 42 positioned within the radial apertures 38, extending into the detents 40, and held therein by means of the plunger 30, thereby preventing any relative movement between the housing and the inertia weight member.

Housing 10 is closed at one end by an end closure member 46 and inertia weight member 22 is spaced therefrom within the housing by a motion resisting coil spring 48 biased therebetween, which circumscribes an axial extending bar 50 centrally positioned within the cavity defined by counterbore 18. One end of the bar 50 is integrally connected to the interior portion of end closure 46 and the other end thereof is slideably received within bore 24 of the inertia member 22. It may be seen that both the end closure 46 and the inertia member 22 are provided with central recessed portions in the ends thereof mutually facing each other, which are defined by annular end protruding portions 52 and 54, respectively. The end protrusions 52 and 54 are adapted to abut against one another whenever the inertia weight 22 moves axially within counterbore 18 towards end closure 46, thereby serving to limit the movement thereof, while the cavity defined therebetween by the central recesses at the time of contact of the protruding portions provides an area suitable for containing the compressed coil spring 48.

A gear rack 56 is secured to the inertia weight 22 on the peripheral area of the end thereof facing end closure 46 for movement with the inertia weight and is adapted for engaging a pinion element 58 which is part of a runway escapement mechanism, generally indicated by numeral 60. Pinion 58 is adapted to turn with an escapement wheel 62 upon a shaft 64, thereby regulating the speed of the escapement and of all the elements engaged therewith.

Also provided within housing 10 is a latch type back means 66 comprised of a spring loaded bevel-edged latching member contained within the wall of housing 10 and extending normally into the cavity defined by counterbore 18, in the area between end closure 46 and inertia weight member 22. The inertia weight member 22 is provided with a notched portion 68 in the outer peripheral wall thereof and aligned with the bevel-edged latching member for engagement therewith when the inertia weight 22 is moved axially within counterbore 18 towards end closure 46. Two leaf spring switch arms 70 and 70a are secured to the interior surface wall of housing 10, axially spaced thereon, with the free ends thereof being positioned so as to engage two sets of fixed contacts also secured to the housing. As shown, with the weight in its normal position, two contacts are closed and two contacts are open, and when the inertia weight 22 has been moved to the extreme left, the two closed and the two open contact conditions are interchanged. In this position the inertia weight 22 depresses the free end of leaf spring 70 and permits the free end of leaf spring 70a to move inwardly into one of the radial apertures 38 in weight 22, thereby opening its switch.

The operation of the device is as follows:

The device of the present invention is inserted into an aperture or well formed in the bomb structure and is secured thereto by any suitable means and the rod member 32 is connected to the shroud lines of the parachute. The fixed contacts are connected to the fuze-arming timing mechanism in such a manner that the pair of contacts associated with switch arm 70a will, when closed by switch arm 70a, cause the fuze-arming timing mechanism to operate for a predetermined period of time before the bomb is armed while the pair of contacts associated with switch arm 70 will, when closed by the movable switch arm 70, control the fuze-timing mechanism to operate for a shorter interval of time. When the bomb is released from the aircraft and the parachute is opened, a tensile force is developed between the bomb and the parachute, to which the housing 10 and the rod 32 are attached respectively; the tensile force tending to pull or withdraw rod 32 from the housing 10. Shear pin 36 is thereby sheared by the snatch force developed when the parachute initially pops open. Movement of the plunger 30 into the tapered counterbore area 14 where plunger portion 26 becomes secured adjacent shoulder 16 within the housing 10 permits the spherical balls 42 to move radially inward into bore 24 of the inertia weight 22, thereby freeing the inertia weight 22 from its locked position. If the parachute fully deploys so that sufficient deceleration is imparted to the bomb, weight 22 will begin to move toward end closure 46, compressing spring 48 therebetween. The rate of movement of the weight 22 is restricted by the escapement mechanism 60 thereby insuring that the duration of the deceleration of the bomb by the parachute is at least a predetermined period of time. If the decelerating force should become less than a predetermined amount prior to expiration of the predetermined period of time, the helical compression spring 48 would return inertia weight 22 to its original position. Upon the application of the design acceleration force, however, for the predetermined period of time, the weight 22 travels to its activated position and is locked there by latch-type lock 66. In this position switch arm 70a is disengaged from its associated contacts and switch arm 70 becomes engaged with its associated contacts, thereby changing the fuze-arming timing period to a shorter interval of time.

If, however, the parachute had not been fully deployed and had not imparted sufficient deceleration to the bomb, even though the parachute snatch force may have been sufficient to cause shearing of the shear wire 36, absent the application of the design deceleration force for a predetermined period of time the inertia weight 22 is prevented from traveling all the way to its activated position by the run-away escapement mechanism 60. Spring 48 would return weight 22 to its original inactive position, and the switch arms 70 and 70a would remain in the positions shown in the drawing, thereby causing the fuze-arming timing mechanism to operate for the predetermined longer period of time before the bomb is armed.

From the foregoing description, it is seen that the device of the present invention guarantees the safety of the pilot by normally setting a relatively long time interval into the fuze-arming timing mechanism of the bomb to permit the pilot to escape from the danger zone before the bomb is detonated and shortens the fuze-arming time interval only if the parachute has sufficiently decelerated the bomb.

It should be understood, of course, that the foregoing disclosure relates to only a preferred embodiment of the invention and that numerous modifications and alterations may be made therein without departing from the spirit and the scope of the invention as set forth in the appended claims.

What is claimed is:

1. A switch responsive to the retarding force of a free-falling parachute retarded drop bomb for controlling the timing of a fuze-arming timing mechanism comprising:
   an elongated housing adapted to be secured to the drop bomb,
   an inertia weight member slideably disposed within said housing and adapted to move rapidly from a first position to a second position upon application of a deceleration force,
   releasable coupling means connecting said inertia weight to the parachute and normally locking the weight in said first position until the parachute opens,
   runaway escapement means adapted to retard and regulate the rate of movement of the weight member when unlocked by said releasable coupling means,
   at least one pair of fixed electrical contacts mounted on said housing, and
   a normally-open switch arm for cooperation with said fixed contacts positioned within said housing in the path of movement of said inertia weight and closed by said weight upon movement thereof to said second position,
   spring means within said housing to bias said inertia weight member towards said first position,
       said spring having sufficient compressive force to return said inertia weight to said first position if the deceleration force is not equal to a minimum predetermined magnitude,
   whereby the releasable coupling means frees the inertia weight for deceleration-responsive movement within the housing when the parachute opens and the inertia weight is thereafter moved from a first to a second position to close a switch in the fuze arming timing mechanism only by a deceleration force of a minimum predetermined magnitude and duration.

2. The switch defined in claim 1 wherein the releasable coupling means comprises
   a plunger disposed within said housing,
   a rod connected at one end to said plunger and at the other end to the parachute, said rod extending axially from said plunger and through an end wall of said housing, and
   a ball-lock mechanism which locks the inertia weight member to the housing in said first position until the rod and plunger have been displaced by the snatch force of a deployed parachute.

3. The switch defined in claim 2 wherein the releasable coupling means further includes a shear pin connecting said rod and said end wall of said housing for preventing the release of said ball-lock mechanism until a force of a predetermined magnitude is applied to said rod by said parachute.

4. The switch defined in claim 1 wherein a gear rack is positioned on said inertia weight member for engaging said clock escapement means during movement of the inertia weight member between said first and second position.

5. The switch defined in claim 1 wherein said inertia weight member is provided with a notched-out portion and further including a spring-biased latch means disposed within said housing adapted for engaging said notch in said inertia weight member when the weight is in said second position, thereby locking the weight member in said second position.

6. A safety and arming mechanism for a parachute retarded drop bomb comprising,
   an elongated housing adapted to be secured to a drop bomb and having an axial bore and first and second counterbores therein axially spaced from one end of said housing,
   an inertia weight member slideably positioned within said second counterbore of said housing for movement from a first position to a second position axially disposed therein, and having an axial bore and a counterbore facing said one end of said housing,
   said weight member being further provided with a plurality of radial apertures in the wall thereof near said one end thereof,
   a plunger slideably disposed in close-fitting relationship within the counterbore of said inertia weight member and having a rod portion at one end thereof extending through said axial bore at said one end of said housing for connection to the parachute,
   detent means in the second counterbore of said housing aligned with said apertures in said weight member when said weight member is in said first position,
   spherical balls in each of said apertures and aligned detents to provide a ball-lock mechanism maintaining the inertia weight member in said first position until the plunger is displaced axially within the first housing counterbore by the snatch force of the parachute upon said rod when the parachute opens,
   means closing the other end of said housing,
   means disposed between said end closure means and said inertia weight member for biasing said weight member toward said first position and having sufficient force to return said inertia weight to said first position if the deceleration force is not equal to a minimum predetermined magnitude,
   runaway escapement means adapted to retard and regulate the rate of movement of the weight member when released by said ball-lock mechanism,
   a gear rack on said inertia weight member and engaging said escapement means,
   at least one pair of fixed electrical contacts mounted on said inner wall surface of the housing near said other end thereof,
   at least one spring-leaf switch arm positioned in the path of movement of said weight member and adapted to connect said contacts when engaged by said weight member as it moves to the second position,
   means responsive to the movement of the weight member to the second position for locking the weight member in said second position, and
   means for preventing release of the ball-lock mechanism until a force of predetermined magnitude is applied to said plunger-rod by said parachute.

References Cited
UNITED STATES PATENTS

| | | | |
|---|---|---|---|
| 2,683,194 | 7/1954 | Mathisen | 200—61.45 |
| 2,686,025 | 8/1954 | Klas | 102—70.2 X |
| 2,827,850 | 3/1958 | Muzzey | 102—16 |
| 3,117,196 | 1/1964 | Vincent | 200—61.45 |
| 3,263,035 | 7/1966 | Semenoff | 102—4 X |

BENJAMIN A. BORCHELT, *Primary Examiner.*

SAMUEL FEINBERG, *Examiner.*

G. H. GLANZMAN, *Assistant Examiner.*